(12) United States Patent
Ulichney et al.

(10) Patent No.: US 6,817,721 B1
(45) Date of Patent: Nov. 16, 2004

(54) SYSTEM AND METHOD FOR CORRECTING PROJECTOR NON-UNIFORMITY

(75) Inventors: Robert A. Ulichney, Stow, MA (US); Himanshu Arora, Champaign, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 7 days.

(21) Appl. No.: 10/612,308

(22) Filed: Jul. 2, 2003

(51) Int. Cl.$^7$ .................. G03B 21/14; G03B 21/00; H04N 3/23; H04N 1/405; G09G 5/02

(52) U.S. Cl. .................. 353/69; 353/121; 353/122; 348/746; 348/747; 345/698; 345/596; 358/3.13

(58) Field of Search ................. 353/69, 121–122; 348/744–747; 345/698, 596; 358/3.13; 382/275

(56) References Cited

U.S. PATENT DOCUMENTS

| | | | | |
|---|---|---|---|---|
| 5,483,299 A | * | 1/1996 | Minoura | 348/745 |
| 5,838,396 A | * | 11/1998 | Shiota et al. | 348/745 |
| 6,664,973 B1 | * | 12/2003 | Iwamoto et al. | 345/589 |

* cited by examiner

*Primary Examiner*—Judy Nguyen
*Assistant Examiner*—Magda Cruz

(57) ABSTRACT

A system and method corrects the luminance non-uniformity of an image generating by a projector by generating a correction look-up table (LUT) for the projector. The projector receives input data and projects images based on the input data. The LUT attenuates the displayed image such that the whole image has the same luminance as the dimmest point. Input data received by the projector is modified by the correction information contained LUT, and the "corrected" data is used to run the projector, thereby correcting the non-uniformity in luminance.

14 Claims, 8 Drawing Sheets

SYSTEM AND METHOD FOR CORRECTING PROJECTOR NON-UNIFORMITY

BACKGROUND OF THE INVENTION

1. Field of the Invention

The present invention relates to image projection systems and, more specifically, to correcting projected images.

2. Background Information

Currently, there are a wide-variety of digital image projectors commercially available. Most digital projectors include a video decoder and a light engine. The video decoder converts video data received by the projector, e.g., from the display connection of a personal computer (PC), into pixel and color data. The pixel and color data is then supplied to the light engine, which converts that data into the actual projected image. The light engine includes a lamp, optics and logic for manipulating the light in order to generate the pixels and color.

There are three different types of technologies utilized by the light engines of today's projectors: Liquid Crystal Display (LCD), Digital Light Processing (DLP) and Liquid Crystal on Silicon (LCOS). An LCD light engine breaks down the light from a lamp into red, green and blue components. Each color is then polarized and sent to one or more liquid crystal panels that turn the pixels on and off, depending on the image being produced. An optic system then recombines the three color signals and projects the final image to a screen or other surface.

DLP technology was developed by Texas Instruments, Inc. of Dallas, Tex. A DLP light engine directs white light from a lamp onto a color wheel producing red, green, blue and white light. The colored light is then passed to a Digital Micromirror Device (DMD), which is an array of miniature mirrors capable of tilting back-and-forth on a hinge. Each mirror corresponds to a pixel of the projected image. To turn a pixel on, the respective mirror reflects the light into the engine's optics. To turn a pixel off, the mirror reflects the light away from the optics.

A LCOS light engine combines LCD panels with a low cost silicon backplane to obtain resolutions that are typically higher than LCD or DLP projectors. The LCOS light engine has a lamp whose light is sent to a prism, polarized, and then sent to a LCOS chip. The LCOS chip reflects the light into the engine's optics where the color signals are recombined to form the projected image.

The quality of a projected image is a function of several characteristics, including brightness, also referred to as luminance. Due to the design of the optics within the light engines and/or the lamps themselves, most projectors do not project at a constant luminance level across the entire screen. FIG. 1 is a highly schematic illustration of the luminance levels measured in foot-lamberts of a displayed image 100 that was generated by a projector set to display all pixels at a constant luminance or brightness level. The displayed image 100 has a generally rectangular shape comprising a top edge 102, a right side edge 104, a bottom edge 106 and a left side edge 108. Rather than having a constant luminance throughout, the image 100 has a brightest region 110, which is at approximately 34.0 foot-lamberts, and several regions of decreasing luminance, terminating at a darkest region 112 at the image's upper left corner, which is at approximately 17.8 foot-lamberts. This non-uniformity in luminance detracts from the displayed image.

The luminance non-uniformity of a projector can become more pronounced under certain conditions. For example, when a "composite" image is created by multiple projectors whose individual images are tiled together, e.g., in a 4 by 5 pattern, to form the composite image, the non-uniformity in luminance is often much more apparent. Luminance non-uniformities can also be created (or existing non-uniformities made more pronounced) when the projector is set up at an angle to the display screen or surface. That portion of the displayed image that is closer to the projector will typically be brighter, while those portions located further away will be dimmer.

Accordingly, a need exists for a projector whose displayed image(s) is uniform in luminosity.

SUMMARY OF THE INVENTION

Briefly, the present invention provides a system and method for correcting the luminance non-uniformity of an image generated by a projector. The projector receives input data and projects images based on the input data To correct luminance non-uniformity, a projector correction look-up table (LUT) is created. The LUT attenuates the displayed image such that the whole image has the same luminance as the dimmest point. Input data received by the projector is modified by the correction information contained in the LUT, and the "corrected" data is used to drive the projector's light engine, thereby correcting the non-uniformity in luminance.

A camera is preferably used to record the luminance non-uniformity of the projector at all of output levels supported by the projector. For example, if the projector supports 256 output levels, e.g., 0–255, then 256 images are produced by the projector is and captured by the camera. In the preferred embodiment, an attenuation array is computed for the camera in advance to correct for non-uniformities in the camera's sensors. The images captured by camera, and corrected by the camera's attenuation array, are organized logically into a three-dimensional (3-D) array of camera capture planes where each plane corresponds to the image captured for a respective output level of the projector. Each camera capture plane is examined, and the location, e.g., in x, y coordinates, of the dimmest captured value is identified. This same location in the projector correction LUT is then assigned the input level of the subject camera capture plane. The values of the remaining locations of the LUT are found by searching down the respective columns of the 3-D camera capture array for the plane whose level matches the dimmest captured value for the plane being evaluated. A suitable interpolation scheme may be used to enlarge the LUT from the resolution of the camera to the resolution of the projector. To improve performance, the LUT may be converted into a one-dimensional (1-D) gain-table, that specifies a gain for each projector output level, and a two-dimensional (2-D) spatial attenuation array.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
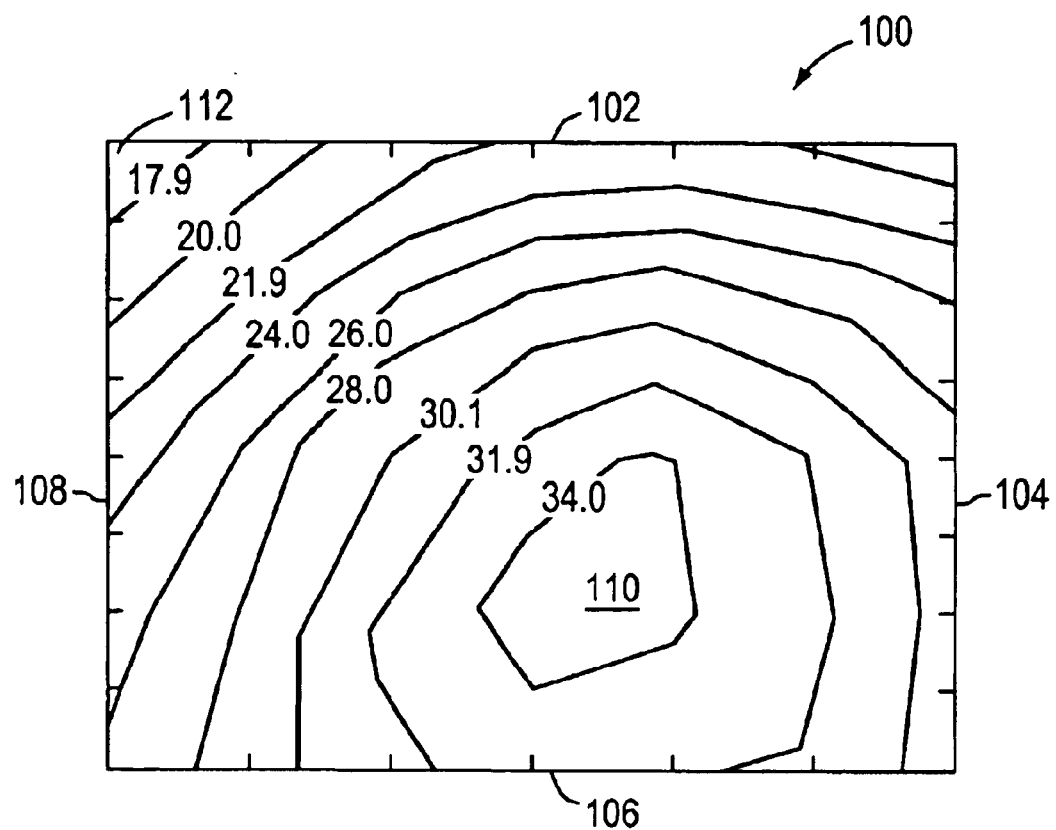
FIG. 1, previously discussed, is a highly schematic drawing of a projected image illustrating projector luminance non-uniformity.
Figure 2:
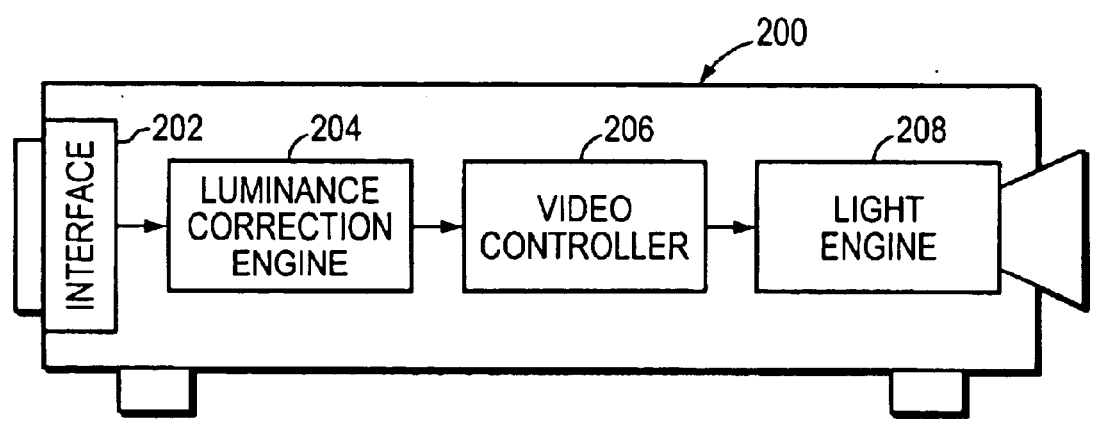
FIG. 2 is a highly schematic, partial block diagram of a digital projector in accordance with the present invention.

FIG. 2 is a highly schematic, partial block diagram of a digital projector 200 in accordance with the present invention. Projector 200 has an interface 202 for receiving input video data from a source, such as a personal computer (PC), a DVD player, etc. In accordance with the present invention, the projector 200 is configured to include a luminance correction engine 204 that receives the picture element (pixel) data from interface 202. As described herein, engine 204 modifies the received pixel data to correct for luminance non-uniformities of the projector 200. Projector 200 further includes a video controller 206 that receives the "corrected" pixel data from engine 204, and performs some additional processing on that data, such as synchronization, linearization, etc. The pixel data is then sent to a light engine 208 for projecting an image to be displayed based on the pixel data received from the video controller 206.

The light engine 208 may use any suitable technology, such as one or more Liquid Crystal Display (LCD) panels, Digital Light Processing (DLP) or Liquid Crystal on Silicon (LCOS). Suitable digital projectors for use with the present invention include the HP (Compaq iPAQ) Model MP 4800 or the HP Digital Projector Model xb31 both from Hewlett Packard Co. of Palo Alto, Calif. Nonetheless, those skilled in the art will recognize that the present invention may be used with other projectors, including those using other types of image generation technologies.

It should be understood that pixel or image information may be in various formats. For example, with bi-tonal image information, there is only one component for representing the image, and that component has two shades. Typically, the shades are black and white although others may be used. With monochrome image information, there is one component used to define the luminance of the image. Monochrome images typically have black, white and intermediate shades of gray. Another format is color, which, in turn, can be divided into two subgroups. The first sub-group is luminance/chrominance in which the images have one component that defines luminance and two components that together define hue and saturation. The second sub-group is RGB. A color image in RGB format has a first component that defines the amount of red (R) in the image, a second component that defines the amount of green (G) in the image, and a third component that defines the amount of blue (B) in the image. Together these three color components define the luminance and chrominance of the image. For ease of description, the term "level" is used herein to refer to any such type of image systems or formats, i.e., bi-tonal, monochrome or color.

In accordance with the present invention, a digital video camera is preferably used to measure the projected display from projector 200. These camera measurements are then used to build a projector correction look-up table (LUT). The projector correction LUT is then utilized by the projector's luminance correction engine 204 to modify the data used to drive the light engine 208, thereby correcting the non-uniformity. Suitable video cameras for use with the present invention include the Hitachi DZ-MV100A and the Sony DCR-VX2000, among others. That is, in a preferred embodiment, the camera utilized by the present invention is a low-cost, conventional digital video camera. Nonetheless, those skilled in the art will recognize that other cameras, including still digital cameras, may be used. Because the individual sensors of such cameras have imperfections and may not detect the same luminance level equally at all points, the camera is preferably subject to a correction process of its own before it is used to build the projector correction LUT.

Specifically, a camera attenuation array is generated for the camera. The camera attenuation array basically flattens the field of the camera correcting for the camera's non-uniform spatial response.

Generating the Camera Attenuation Array

Figure 3:
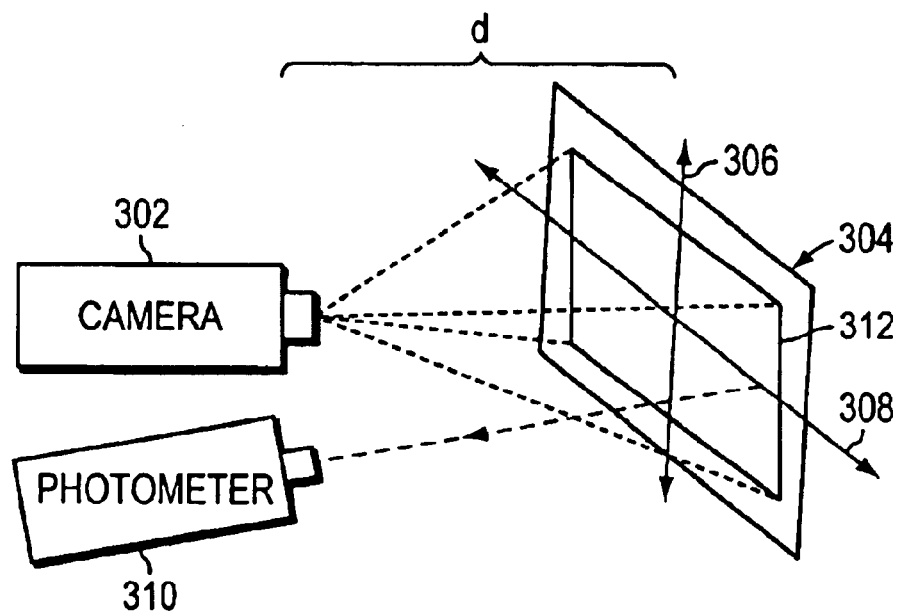
FIG. 3 is a highly schematic illustration of the preferred technique used to create a camera attenuation array.

FIG. 3 is a highly schematic illustration of a preferred technique for generating the attenuation array for a camera 302. To flatten the field of the camera 302, several images of a large white board 304 are preferably captured with the camera 302 under homogenous ambient illumination, e.g., in a room having an even distribution of light, such as in an office or laboratory having a plurality of fluorescent ceiling light fixtures. The white board, which may be a rectangular, foam core poster board, has a vertical axis and a horizontal axis as represented by arrows 306 and 308, respectively. The board 304 is preferably rotated about its two axes 306 and 308, which intersect at the center of the board, until it is determined to be uniformly illuminated across its entire surface. In the illustrative embodiment, a spot photometer 310 having a small angle is used to measure the luminance at different points across the board's surface. As mentioned above, the board 304 is rotated about axes 306 and 308 until the luminance measurements as detected by the spot photometer 310 are all equal.

A suitable means for measuring the luminance of board 304 is the Tektronix Model J16 Photometer with a Tektronix Model J6523 1-degree Narrow Angle Luminance Probe.

Once the board 304 is positioned so that it is uniformly illuminated, camera 302 is placed a focal length "d" from the board 304 and is operated to capture several images or frames of the board 304. The selected focal length "d" preferably results in the board 304 filling the entire image field of the camera 302, as illustrated by camera image field 312, which is smaller than board 304.

The data corresponding to the different images of board 304 as captured by camera 302 are then averaged, to reduce sampling noise, thereby producing a single array of averaged values. Camera 302 may have a resolution of 640 by 480, and may generate pixel values from 0–255, i.e., eight-bit values, where 0 corresponds to black (i.e., dimmest) and 255 corresponds to white (i.e., brightest). Accordingly, the array of averaged values computed for camera 302 will also be 640 by 480, and the values for each pixel will range from somewhere within 0–255, reflecting the non-uniformity of the camera 302.

The pixel having the lowest value in the array of averaged values, which corresponds to the dimmest pixel, is then located. Suppose the pixel values range from 130–210 with the 210 value(s) being at or near the center of the array. Every value in the array of averaged pixel values is then generated by the ratio (dimmest value)/(capture value), e.g., 130/210, 130/130, etc., so as to produce the camera attenuation array, which is 640 by 480. Given this ratio, the values of the camera attenuation array fall within the range of 0 to 1.0. As described herein, from this point on, all images captured by camera 502, including the images that will be taken of the projected displays produced by projector 200, are corrected using this camera attenuation array. Specifically, each captured pixel value from camera 302 is multiplied by that pixel's corresponding correction value, which ranges from 0 to 1.0, to produce a "corrected" pixel value. In this way, any two points that are "seen" by camera 302 with the same luminance will have the same corrected camera capture value.

Those skilled in the art will recognize that a computer, such as a Compaq D315 business PC or a HP workstation zx2000, both of which are commercially available from Hewlett Packard Co., may be used to receive the pixel data from the captured images produced by camera 302, to average those images and to produce the resulting camera attenuation array. More specifically, the computer, which has a memory and a processor, may include one or more software libraries containing program instructions for performing the steps of the present invention.

Camera Capture Array

Figure 4:
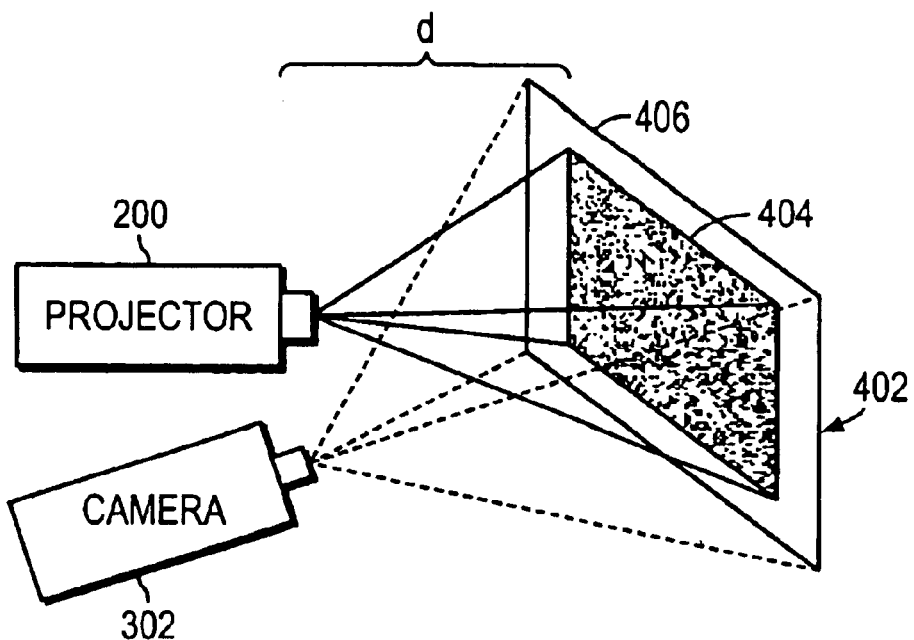
FIG. 4 is a highly schematic illustration of the preferred technique used to create camera capture array.

After generating a camera attenuation array that corrects the image data captured by camera 302, the next step is to build a camera capture array. FIG. 4 illustrates the physical set-up for generating the camera capture array. In particular, the projector 200 is preferably set a distance "d" from a screen 402 where "d" is the same distance as in FIG. 3. The camera 302 is also placed distance "d" from the screen 402. Preferably, the projector 200 is set up perpendicular to the screen 402 such that a displayed image 404 as produced by projector 200 is a true rectangle. The camera 302 has a capture field 406 that is larger than the projected image 404 produced by the projector 200.

The projector 200 is then supplied video data via interface 202 (FIG. 2) that causes the projector 200 to sequentially display a series of projected images onto the screen 402 where all of the pixels for each individual image in the series is at the same input level, e.g., from 0 (black) to 255 (white). In other words, for a given projected image in the series, the input value, e.g., 125, supplied to the projector's light engine is the same for each pixel. The camera 302 captures each such projected image. Preferably, multiple images are captured by camera 302 for each input level displayed by projector 200, corrected with the camera attenuation array and averaged to reduce video noise. The resulting 256 arrays may then be logically stacked to form a three-dimensional (3-D) camera capture array where each data point is uniquely identified by the following tuple:

$c(x_c, y_c, i)$ where $x_c$ is the x-coordinate of a given pixel, e.g., 0–639, $y_c$ is the y-coordinate of the given pixel, e.g., 0–479, and i is the input level, e.g., 0–255.

Figure 5:
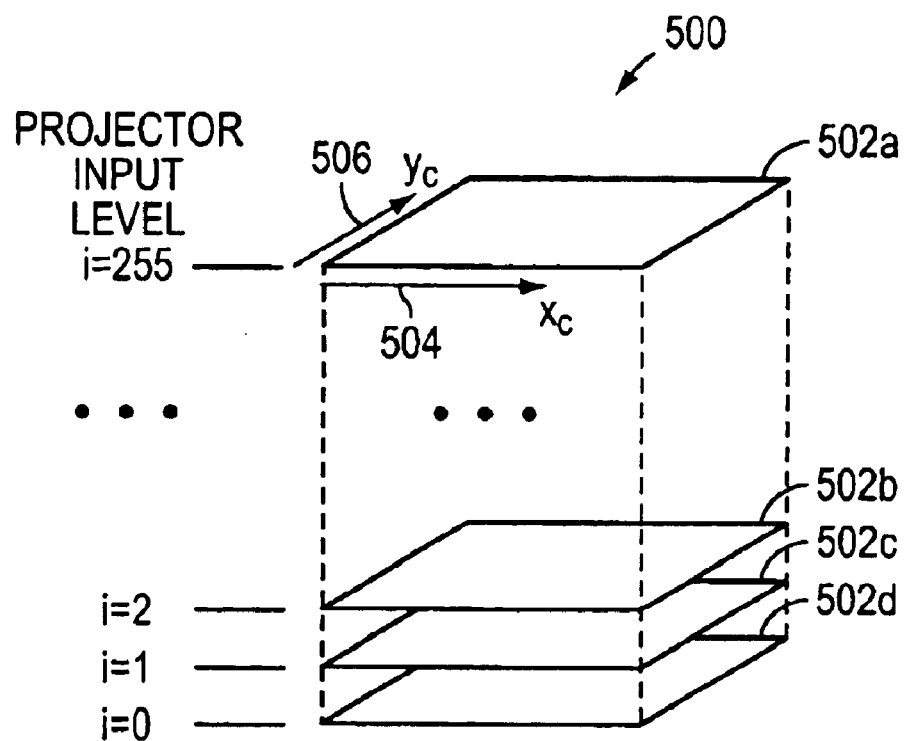
FIG. 5 is a highly schematic illustration of a plurality of camera capture planes logically organized as a three-dimensional array.

FIG. 5 is a highly schematic illustration of a 3-D camera capture array 500 formed by stacking a plurality of camera capture planes 502a–d, only some of which are shown, on top of each other such that the x,y coordinates of all planes 502 are aligned with one another. Each plane 502 corresponds to a respective input level, i, of the projector 200, where i ranges from 0 to 255. As indicated above, all of the planes 502 lie within the same $x_c$ and $y_c$ coordinate system, as indicated by arrows 504 and 506.

It should be understood that the camera 302, unlike the projector 200, may not be perpendicular to the screen 402. In this case, the projected image captured by camera 302 may be a quadrilateral rather than a true rectangle. This quadrilateral is preferably transformed to a rectangle using conventional techniques. Specifically, the transformation or homography from quadrilateral to rectangle may be computed by finding four corresponding points in the two coordinate systems, i.e., the coordinate system of the rectangular image 404 displayed by the projector 200, and the coordinate system of the quadrilateral image 406 captured by the camera 302. Here, the four corners of the displayed rectangular image 404 and the four corners of captured quadrilateral as captured by the camera 302 may be used. A suitable transformation method is described in R. Sukthankar, C. Tat-Jen, G. Sukthankar, J. Rehg, D. Hsu, T. Leung "Self-calibrating camera-projector systems for interactive displays and presentations", *Computer Vision*, 2001, which is hereby incorporated by reference in its entirety.

In the illustrative embodiment, to reduce computational complexity, the spatial dimensions, i.e., $x_c$ and $y_c$, of each camera capture plane 502 are reduced by low-pass filtering and subsampling. A suitable subsample size is 16 by 12, resulting in a subsampled camera capture array having a size of 16×12×256, whose individual data elements may be uniquely identified or addressed by the following tuple:

$c(x_s, y_s, i)$ where, $x_s$ is the x-coordinate of a given pixel in sub-sampled space, e.g., 0–15, $y_s$ is the y-coordinate of the given pixel in sub-sampled space, e.g., 0–11, and i is the input level, e.g., 0–255.

The low-pass filtering and subsampling may be performed as follows; The original grid of 640 by 480 is segmented into equal-sized and equi-spaced rectangular areas. The number of rectangular areas equals the low resolution subsample grid of 16 by 12 with a low resolution grid point in the center of each rectangle. The pixel values assigned to the new low-resolution grid are generated by a weighted average of the surrounding original pixel values. A suitable weighting function is a two-dimensional gaussian with a sigma of 0.3 times the output grid period (in terms of original grid pixels). The output or low-resolution grid period would be 40 in this example. Those skilled in the art will recognize that other averaging filters may also be employed.

Generating the Projector Correction Look-up Table (LUT)

Using the subsampled camera capture array, $c(x_s, y_s, i)$, a projector correction look-up table (LUT) is created having the same size as the subsampled camera capture array. Accordingly, the data elements of the projector correction LUT may be represented by the following tuple:

$p(x_s, y_s, i)$.

The method for creating the projector correction LUT, $p(x_s, y_s, i)$, is as follows. At each plane 502 in the camera capture array 500, which is given by $c(x_s, y_s, i)$, the x and y location of the dimmest pixel is located, i.e., the pixel with the lowest value. This dimmest pixel value is assigned to a variable referred to as α, and the pixel location of the projector correction LUT that corresponds to the pixel location that was found to have the dimmest pixel is assigned a value of i, which is the input level currently being evaluated. The other x,y locations of the projector correction LUT for the input level currently being evaluated are then computed. Specifically, these values are derived using reverse look-up (e.g., by searching down) the columns of the 3-D camera capture array 500, i.e., down the current x,y location, for the plane 502 whose i value matches α. This may best be explained with reference to an example.

Figure 6:
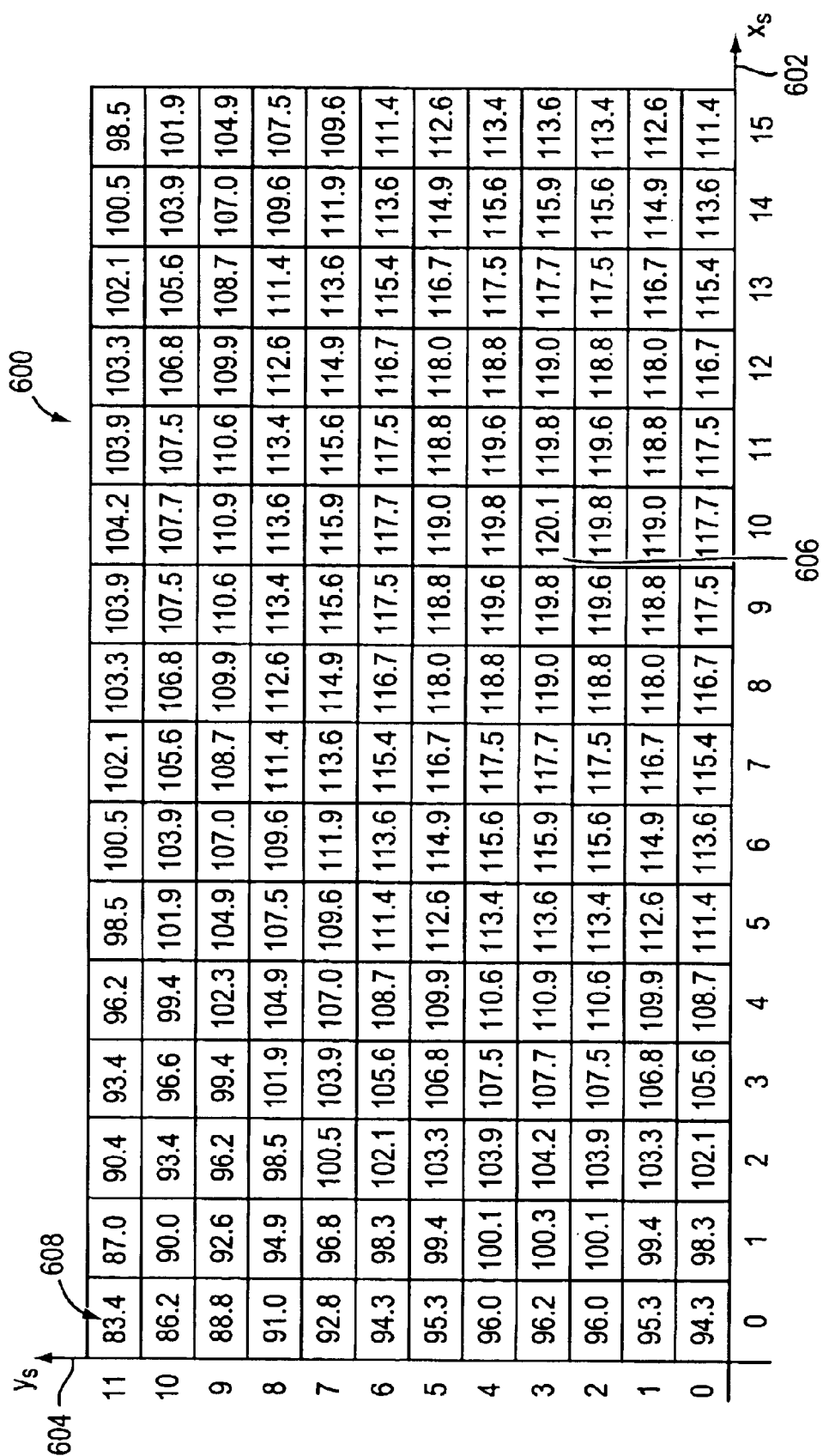
FIGS. 6, 7 and 9 are highly schematic illustrations of image planes.

FIG. 6 is a highly schematic illustration of a subsampled camera capture array 600 for a corresponding input level, e.g., 125. Plane 600 has an $x_s$-axis 602 that is horizontally aligned and a $y_s$-axis 604 that is vertically aligned. The x-coordinates range from 0–15, while the y-coordinates range from 0–11. The intersection of each pair of x,y coordinates defines a cell for storing information. Although plane 600 corresponds to an image produced by projector 200 in which all projector pixels were uniformly illuminated at an input level of 125, the values as captured by the camera 302 range from a highest, i.e., brightest, of 120.1 at location 606 having x,y coordinates of 10,3, to a lowest, i.e., dimmest of 83.7 at location 608 having x,y coordinates of 0,11. As mentioned above, one of the first steps of the present invention is to identify the lowest or dimmest value within each camera capture array. For camera capture plane 600, the dimmest captured value is 83.4, which happens to be at x,y coordinates 0,11. This value is preferably is assigned to a variable, e.g., α.

Figure 7:
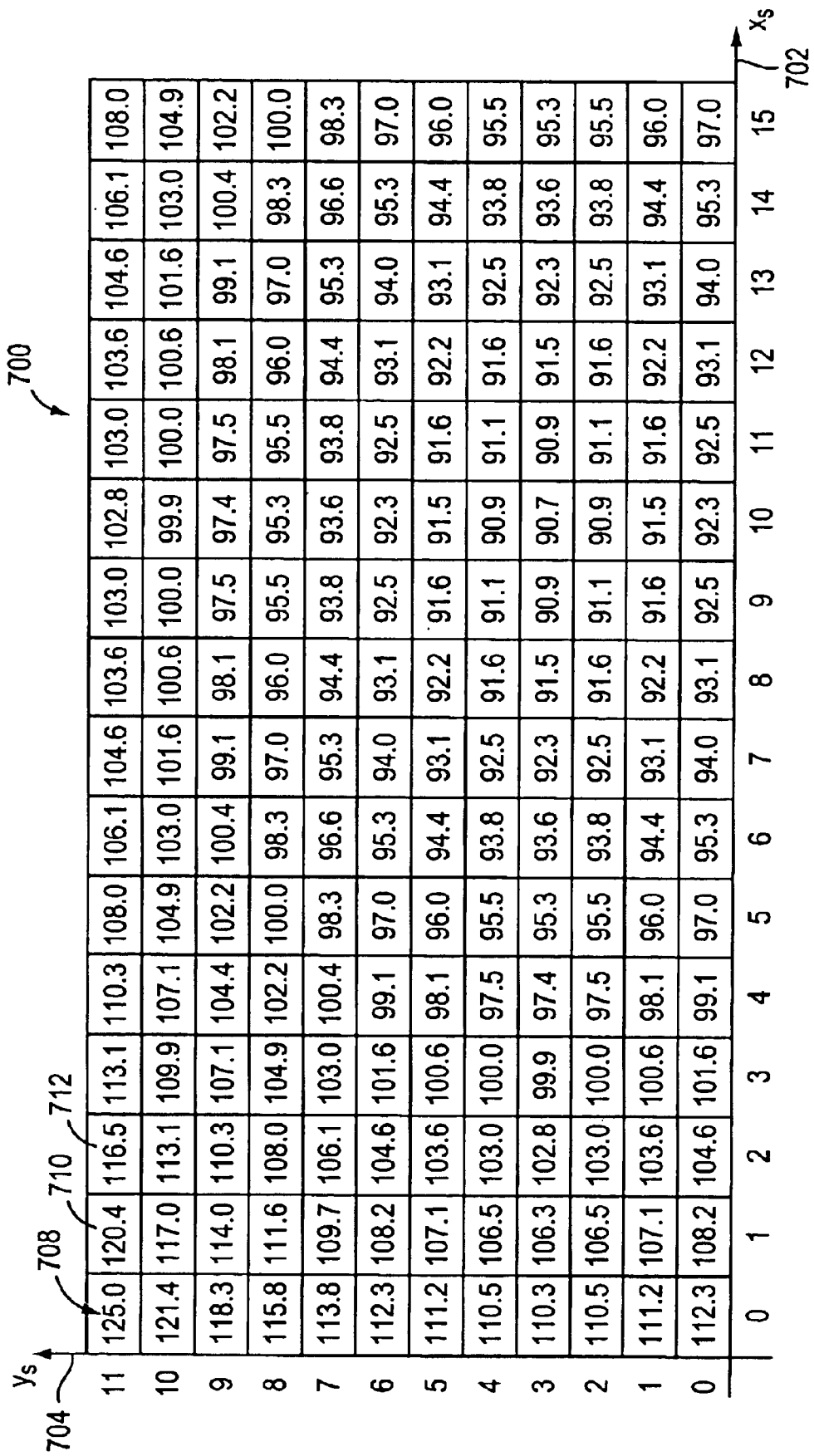

FIG. 7 is a highly schematic illustration of a subsampled projector correction plane 700 for input level 125, as generated from the 3-D camera capture array 500, including plane 600, which also corresponds to projector level 125. Correction plane 700 similarly has an x-axis 702 that is aligned with the horizontal axis, and a y-axis 704 that is aligned with the vertical axis. The intersection of each pair of x,y coordinates defines a cell for storing information, i.e., "corrected" projector input levels. As indicated above, the dimmest value captured for projector input level 125 was 83.4 at cell 608 (FIG. 6) whose x,y coordinates are 0,11. A first step in building the projector correction plane for input level 125 is to set the matching cell of plane 700, i.e., cell 708 whose x,y coordinates are 0, 11 to the value of the subject input level, i.e., to 125. Thus, as indicated in FIG. 7, cell 708 is set to 125.0. The remaining cells of plane 700 are then set with reference to the 3-D camera capture array 500.

Specifically, suppose the next value of plane 700 that is to be computed is at cell 710, whose x,y coordinates are 1,11. The value from plane 600 corresponding to coordinates 1,11 is 87.0, and the value of α is 83.4. To derive the value to be assigned to cell 710 of plane 700, a reverse look-up is performed on the 3-D camera capture array 500 for all input levels 0–255 to find the one plane 502 at which the captured value at x,y location 1,11 is the same as α, i.e., 83.4. Suppose the column of captured values within array 500 at x,y coordinates 1,11 include the following:

| Camera Capture Array Values at x,y, location 1,11 | Input Level |
|---|---|
| 84.3 | 122 |
| 83.7 | 121 |
| 83.2 | 120 |
| 82.7 | 119 |

Here, the value of α, which is 83.4, falls between the camera capture plane 502 for input level 120, whose captured value is 83.2, and the camera capture plane 502 for input level 121, whose captured value is 83.7. Because the current value of α does not appear on one of the actual camera capture planes 502, a linear interpolation process is performed on the values from the two adjacent camera capture planes 502 in order to find the matching, "corrected" input level for a captured value of 83.7 at x,y coordinates 1,11. In this case, the two adjacent planes correspond to input level 120 and input level 121. A linear interpolation process performed on these two adjacent planes for a capture value of 83.4 yields an input level of 120.4. Accordingly, cell 710 of projector correction plane 700 is set to 120.4, as illustrated in FIG. 7.

Suppose the next value of the projector correction plane 700 to be computed is at cell 712, whose x,y coordinates are 2,11. The captured value from camera capture plane 600 (FIG. 6) at x,y location 2,11 is 90.4, and the value of a, for this particular array, is 83.4. Again, to find the value to be assigned to cell 712 of projector correction plane 700 at x,y coordinates 2,11, a reverse look-up is performed on the 3-D array 500 of planes 502 for all input levels 0–255 to find the one plane (real or virtual) at which the value corresponding to x,y coordinates 2,11 is the same as α, i.e., 83.4. In this case, suppose the value 83.4 falls between the planes whose input levels are 116 and 117, and that a linear interpolation process performed on the values from these two planes yields a correction value of 116.5 for x,y coordinates 2,11. This computed correction value, 116.5, is then loaded into cell 712, as indicated in FIG. 7.

This process of computing the "corrected" input levels for each x,y location is repeated for all other locations within the projector correction plane 700, thereby generating a fully populated plane 700 for input level 125. This process is also repeated for each input level 0–255. That is, the dimmest camera capture value of the subject camera capture plane 502 is identified, and the correction value of the respective projector correction plane 700 matching the location of the dimmest captured value is set to the input level being evaluated. The dimmest capture value is also assigned to the variable α, and the remaining values of this new projector correction plane 700 are derived using the reverse-lookup procedure described above.

The individual projector correction planes 700 are then logically stacked on top of each other to form a projector correction look-up table (LUT) that is similar in appearance to the 3-D camera capture array 500. To match the size of the subsampled projector correction planes 700 that make up the LUT, which are 12 by 16, to the size of the projector display space, e.g., 768 by 1280, each such projector correction plane 700 is enlarged. This may be achieved using a known interpolation scheme, such as bi-linear interpolation.

A suitable algorithm for performing bilinear interpolation is described in P.S. Heckbert (editor) Graphic Gems IV IBM (1994), which is hereby incorporated by reference in its entirety.

Each corrected input level within the resulting projector correction LUT may be given by:

$$p(x_p, y_p, i)$$

where, $x_p$ is the x-coordinate of a given pixel in projector space, e.g., 0–1279, $y_p$ is the y-coordinate of the given pixel in projector space, e.g., 0–767, and i is the raw or uncorrected input level, e.g., 0–255.

In a first embodiment of the present invention, the luminance correction engine 204 is loaded with the plurality of projector correction planes 700 forming the projector correction LUT. That is, the luminance correction engine 204 includes one more memory structures, such as a Dynamic Random Access Memory (DRAM) or a Synchronous Random Access Memory (SRAM), among others, that are loaded with the 3-D projector correction LUT. Pixel data, e.g., a pair of x,y coordinates, such as 7,2, and the matching raw or uncorrected input level, such as 125, is received at engine 204 from interface 202. Engine 204 uses the received information to perform a look-up on the projector correction LUT. Specifically, engine 204 uses the raw or uncorrected input level, i.e., 125, to identify the matching the projector correction plane 700 within the LUT. Engine 204 then uses the specified x,y coordinates, i.e., 7,2, to locate the respective cell of this matching projector correction plane. Suppose the identified cell contains a value of 123. In response, the luminance correction engine 204 provides the video controller 206 with this "corrected" input level, i.e., 123, for the subject location, rather than the input level received via the interface 202, i.e., 125. This correction process is repeated for all uncorrected input level/x,y coordinate pairs received at the interface 202. The corrected levels may then be processed by the video controller 206 and passed to the light engine 208, resulting in projected images generated by projector 200 being uniform in luminance across the entire displayed image.

Optimized Run-time system

For a projector 200 having a resolution of 768 by 1280 and 256 different output levels, the projector correction LUT will have 768×1280×256 or 2.5×10$^8$ different correction values. Assuming each correction value is 8-bits, the LUT will require a memory resource capable of storing about 200 Megabytes (Mbytes) of data. In addition, a separate look-up will have to be performed on this table for every uncorrected input level/x,y pair received at interface 202. Such an arrangement, although capable of generating a uniform projected display, nonetheless demands significant memory and processor resources. Those skilled in the art will recognize that optimizations for reducing the memory/processor requirements are possible.

Figure 8:
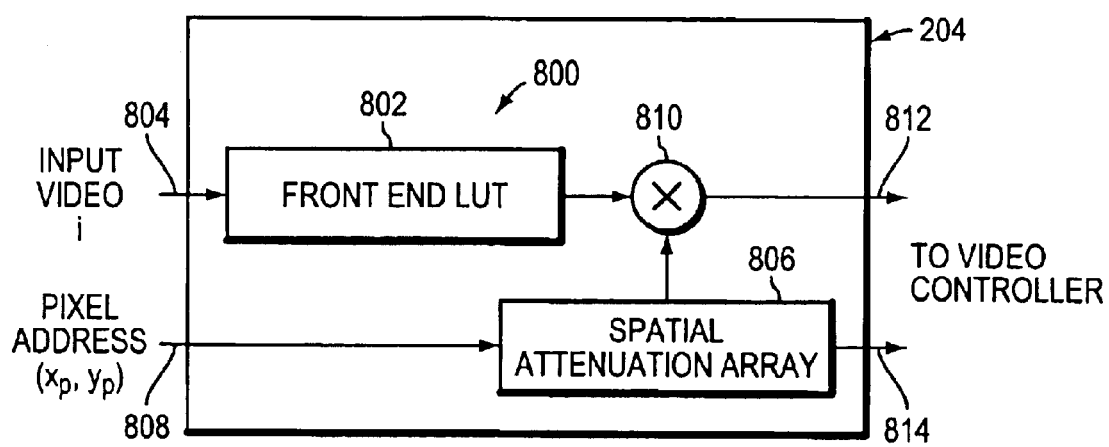
FIG. 8 is a highly schematic illustration of a preferred run-time system in accordance with the present invention.

FIG. 8 is a highly schematic illustration of the luminance correction engine 204 incorporating a run-time system 800 configured and arranged in accordance with a preferred embodiment of the present invention. Run-time system 800 includes a front end look-up table (LUT) 802 that receives uncorrected input levels, i, from interface 202 (FIG. 2) as indicated by arrow 804. Run-time system 800 further includes a spatial attenuation array 806 that receives the pixel addresses, in projector space, i.e., $x_p$, $y_p$, corresponding to the respective input levels being supplied to the front end LUT 802, as indicated by arrow 808. The run-time system 800 also includes multiplier logic 810 that receives the output of the front end LUT 802 and the spatial attenuation array 806 for each input level/x,y coordinate pair. The multiplier logic 810 multiplies those outputs together and the resulting "corrected" input level is supplied to the light engine 206 (FIG. 2) along with the corresponding pixel address information, as indicated by arrows 812 and 814, respectively.

To generate the spatial attenuation array 806, the projector correction plane 700 for each input level 0 through 255 is normalized by dividing each correction value by the maximum value in each plane. For plane 700 (FIG. 7), the maximum value is 125.0 at cell 708. Accordingly, each value within plane 700 is divided by 125.0, thereby normalizing the plane from 0 to 1.

Figure 9:
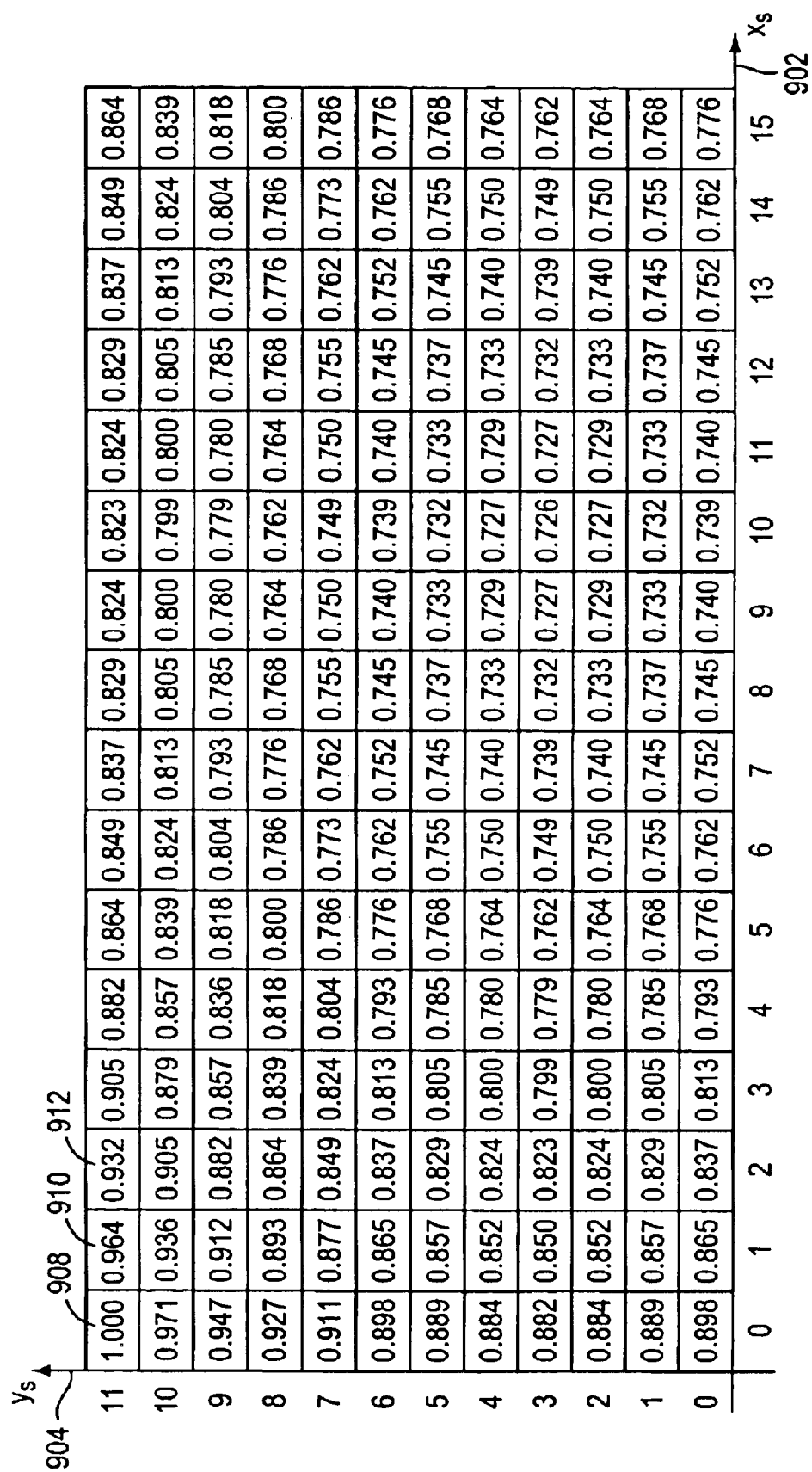

FIG. 9 is a highly schematic illustration of a normalized correction plane 900 for input level 125 corresponding to projector correction plane 700. Normalized correction plane 900 has an x-axis 902 that is horizontally aligned and a y-axis 904 that is vertically aligned. The x-coordinates range from 0–15, while they-coordinates range from 0–11. The intersection of each pair of x,y coordinates defines a cell for storing information. Cell 908, which corresponds to cell 708 of projector correction plane 700 at which the maximum value is located, is set to 125/125 or "1.000" as shown in FIG. 9. The values to be loaded into the remaining cells are similarly computed by dividing the matching value in projector correction plane 700 by the maximum value, i.e., 125. Thus, cell 910 is set to 120.4/125 or "0.964", cell 912 is set to 116.5/125 or "0.932", and so on. Every projector correction plane 700 is normalized in this manner so that all of the correction values range from 0 to 1 for each normalized projector correction plane. Next, a single 2-D plane is constructed from the 256 normalized projector correction planes by averaging the normalized values for every x,y pair from all 256 normalized projector correction planes. In other words, the normalized projector correction planes 900 may be logically stacked one on top of the other to form a 3-D array, and the values from each column of this array (which all have the same x,y coordinates) are added together and divided by 256, which is the total number of planes in the 3-D array. This process is repeated at every x,y pair to produce a single, 2-D spatial attenuation array. The equation for computing the spatial attenuation array is as follows:

$$a_P(x, y) = \operatorname*{avg}_{i}\left[\frac{p(x, y, i)}{\max_{(x,y)}[p(x, y, i)]}\right]$$

The front end LUT 802 is preferably computed as follows. For each input level, i=0–225, the respective projector correction plane 700 is divided by the spatial attenuation array. That is, the value stored at each cell of plane 700 is divided by the value from the spatial attenuation array for that location. For example, consider cell 708 of projector correction plane 700 whose value is 125.0. Suppose the value of the spatial attenuation array for this location, i.e., x,y coordinates 0,11, is 0.9997. Then, 125.0 is divided by 0.9997 to give 125.0375. After dividing each projector correction plane 700 by the spatial attenuation array, each resulting plane is averaged over x,y to produce a single value for that projector correction plane 700. That is, all of the values of the current projector correction plane being evaluated, after being divided by the spatial attenuation array, are added together and divided by 16×12 or 192. The result for projector correction plane 700, which corresponds to input level 125, for example, may be 120.4. This process is repeated for each projector correction plane 700, thereby producing the one-dimensional (1-D) front end LUT 802, where each uncorrected input level, i.e., 0–255, maps to a single value.

The equation for computing the front end LUT is as follows:

$$g(i) = \operatorname*{avg}_{(x,y)}\left[\frac{p(x, y, i)}{a_p(x, y)}\right]$$

It should be understood that the spatial attenuation array represents the shape of luminance variation, also referred to as the distortion, across the projector plane. The front end LUT, on the other hand, represents the gain or amplitude of the distortion. Those skilled in the art will recognize that other and/or additional optimizations may be performed.

In operation, the run-time system 800 receives an uncorrected projector input level, e.g., 125, and a set of x,y coordinates, e.g., 3,11. Using the received, uncorrected input level, i.e., 125, a look-up is performed at the 1-D front end LUT 802 producing a single output value, e.g., 120.4. The x,y coordinates map to a normalized attenuation value in the 2-D spatial attenuation array 806, e.g., 0.9877. These two values, 120.4 and 0.9877 are provided to the multiplier logic 810 and multiplied together generating a corrected projector level, i.e., 118.9, which is then provided to video controller 206 (FIG. 2) along with the x,y coordinates, i.e., 3,11, for further processing and ultimately for display by the projector.

In the illustrative embodiment, the spatial attenuation array 806 and front end LUT 802 are computed in sub-sampled space, e.g., with 12×16 arrays, and then interpolated, e.g., using bilinear interpolation, to the full projector resolution, e.g., 1280 by 768. The spatial attenuation array 806 represents the shape of luminance variation, also referred to as the distortion, across the projector plane. The front end LUT 802, on the other hand, represents the gain or amplitude of the distortion.

It will be understood to those skilled in the art that the run-time system 800, including each of its sub-components, may be implemented in hardware through registers and logic circuits formed from Application Specific Integrated Circuits (ASICs) or Field Programmable Gate Arrays (FPGAs), among other hardware fabrication techniques. Alternatively, run-time system 800 may be implemented through one or more software modules or libraries containing program instructions pertaining to the methods described herein and executable by one or more processing elements (not shown) of projector 200. Other computer readable media may also be used to store and execute these program instructions. Nonetheless, those skilled in the art will recognize that various combinations of software and hardware, including firmware, may be utilized to implement the present invention.

It should be understood that, as the size of even the subsampled camera capture array 500 (FIG. 5) can be large, it may be further subsampled by factors of two in one or both directions. For every halving in size along a given dimension, one less bit of pixel address information is need to uniquely address the cells of the array. This has the effect of approximating the attenuation as constant in blocks of size $2^m$ by $2^n$, where m and n are the subsample rates in the x and y dimensions. Those skilled in the art will recognize that other and/or additional optimizations may be performed.

For projectors having a single LCD panel through which light is passed, the non-uniformity in luminance is the same in all three color planes, e.g., red, green and blue. Thus, a separate but identical run time system 800 is preferably built for each color, e.g., red, green and blue. For projectors having multiple LCD panels, the non-uniformity in luminance may vary by panel. In this case, a separate camera capture array is built for each color, e.g., red, green and blue, and separate projector correction LUTs and separate run-time systems having different correction values are similarly developed.

It should be understood that the present invention is especially suited for a projector that has a built in video camera, such as the TLP-261U Projector from Toshiba.

The present invention may also be used to correct luminance non-uniformity resulting from the projector 200 not being perpendicular to the screen. If the projector is off in only one direction or axis (e.g., above, below, left or right), the result is known as a "keystone" effect. If the projector is off in two directions or axes (e.g., above and left), the result is known as "oblique". In either case, the present invention will correct for such non-uniformity by dimming the brighter pixels to the level of the dimmest pixel for each input level.

The present invention may similarly be used to correct luminance non-uniformity caused by the "screen" being other than a flat plane. For example, luminance non-uniformity may be caused by aiming the projector to display images on an inside corner between a white wall and a gray file cabinet. In such cases, the subsample size ($x_5$, $y_5$) is preferably selected to be much larger than the details of the irregular display screen.

The foregoing description has been directed to specific embodiments of the present invention. It will be apparent, however, that other variations and modifications may be made to the described embodiments, with the attainment of some or all of their advantages. For example, projector correction arrays may be generated for only some as opposed to all of the input levels of the subject projector. Therefore, it is the object of the appended claims to cover all such variations and modifications as come within the true spirit and scope of the invention.

What is claimed is:

1. A method for correcting luminance non-uniformity in an image displayed by a projector in response to input image data, the method comprising the steps of:

using a digital camera to capture images generated by the projector at constant input levels, each captured image having a dimmest point;

generating from the captured images a projector correction plane for each of at least some of the input levels, each projector correction plane configured to attenuate input image data to match the dimmest point as captured by the camera for the respective input level; and modifying input image data to the projector with the generated projector correction planes such that the resulting display image is uniform in luminance.

2. The method of claim 1 further comprising the step of generating a camera attenuation array that flattens the field of the camera.

3. The method of claim 2 wherein the step of generating the camera attenuation array comprises the steps of:

capturing one or more images of a uniformly illuminated two-dimensional ("2-D") plane, the one or more images having a dimmest point;

dividing each point of the captured image into the dimmest point.

4. The method of claim 3 wherein each captured image has a plurality of pixel values, the pixel values for each captured image are averaged, and each pixel value is divided into a dimmest pixel value to produce the 2-D camera attenuation array.

5. The method of claim 4 wherein the 2-D plane whose image is captured by the camera is a white board disposed within a space having homogenous, ambient illumination so that the white board is evenly illuminated relative to the camera.

6. The method of claim 1 wherein the projector has a plurality of projector pixels and the camera has a plurality of camera pixels, and the step of using the camera comprises the steps of:

supplying input data to the projector such that each projector pixel is at a first input level;

capturing the image produced by the projector at the first input level multiple times;

averaging the multiple captured images to produce an average camera captured image plane for the first input level; and repeating the above steps for each projector input level.

7. The method of claim 6 wherein the step of generating the projector correction planes comprises the steps of:

organizing the averaged camera captured image planes into a camera capture array, each plane associated with a projector input level and having a dimmest camera pixel value;

identifying the dimmest camera pixel value for the camera capture plane associated with a selected projector input level;

in the projector correction plane associated with the selected projector level, setting the pixel that matches the dimmest pixel from the respective averaged camera capture plane to the value of the selected projector input level;

searching the columns associated with each pixel of the averaged camera capture array other than the dimmest pixel for the averaged camera capture plane whose pixel value matches the dimmest pixel value; and setting the pixel in the projector correction plane to the projector input level associated with the averaged camera capture plane that matches the dimmest pixel value.

8. The method of claim 7 wherein the camera has a camera resolution, the method further comprising the step of subsampling each averaged camera capture plane such that the subsampled planes are smaller than the resolution of the camera.

9. The method of claim 8 wherein the projector correction planes have a size equal to the subsampled averaged camera capture planes.

10. The method of claim 9 wherein the projector has a projector resolution, the method further comprising the step of interpolating each subsampled projector correction plane to match the projector resolution.

11. The method of claim 1 further comprising the steps of converting the projector correction planes into a two-dimensional spatial attenuation array and a one-dimensional gain vector.

12. The method of claim 11 further comprising the steps of:

normalizing each projector correction plane; and averaging all of the normalized projector correction planes to produce the spatial attenuation array.

13. The method of claim 12 further comprising the steps of:

dividing each projector correction array by the spatial attenuation array; and averaging each divided projector correction array to produce the gain vector.

14. A projector comprising:

an interface for receiving image data including input levels and corresponding pixel location data;

a luminance non-uniformity correction engine for modifying the input levels received at the interface to be uniform in luminance; and a light engine for generating a projected images based upon the modified input levels and corresponding pixel location data from the luminance non-uniformity correction engine, wherein the projector has a dimmest point for each input level, and the luminance non-uniformity correction engine attenuates the input level data to match the dimmest point.

\* \* \* \* \*